(12) United States Patent
Park et al.

(10) Patent No.: US 9,201,254 B2
(45) Date of Patent: Dec. 1, 2015

(54) STEREOSCOPIC IMAGE DISPLAY AND METHOD FOR MANUFACTURING THE SAME

(71) Applicant: LG DISPLAY CO., LTD., Seoul (KR)

(72) Inventors: Jinwoo Park, Goyang-si (KR); Donghoon Lee, Goyang-si (KR); Seok Kim, Paju-si (KR); Sungpil Ryu, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 438 days.

(21) Appl. No.: 13/727,280

(22) Filed: Dec. 26, 2012

(65) Prior Publication Data

US 2014/0009703 A1 Jan. 9, 2014

(30) Foreign Application Priority Data

Jul. 5, 2012 (KR) .................. 10-2012-0073267

(51) Int. Cl.
*G02F 1/1335* (2006.01)
*G02F 1/13* (2006.01)
*H04N 13/04* (2006.01)
*G02F 1/1362* (2006.01)

(52) U.S. Cl.
CPC ............ *G02F 1/1313* (2013.01); *G02F 1/1303* (2013.01); *H04N 13/0434* (2013.01); *G02F 1/133512* (2013.01); *G02F 1/136209* (2013.01)

(58) Field of Classification Search
CPC .................. G02F 1/133512; G02F 1/136209; G02F 1/1313; G02F 1/1303; H04N 13/0434
See application file for complete search history.

(56) References Cited

U.S. PATENT DOCUMENTS

| 5,510,916 | A  | * | 4/1996 | Takahashi | 349/110 |
| 5,784,139 | A  | * | 7/1998 | Chigrinov et al. | 349/117 |
| 6,169,590 | B1 | * | 1/2001 | Abileah et al. | 349/120 |
| 9,025,112 | B2 | * | 5/2015 | Xu et al. | 349/106 |
| 2004/0201795 | A1 | * | 10/2004 | Paukshto | 349/96 |
| 2009/0310044 | A1 | * | 12/2009 | Lee | 349/15 |
| 2012/0162580 | A1 |   | 6/2012 | Wu | |
| 2012/0280259 | A1 | * | 11/2012 | Hatta et al. | 257/89 |

FOREIGN PATENT DOCUMENTS

CN 202677021 U 1/2013

OTHER PUBLICATIONS

Office Action dated Jul. 15, 2015 for corresponding Chinese Patent Application No. 201210545269.9, 12 pages.

* cited by examiner

*Primary Examiner* — James Dudek
(74) *Attorney, Agent, or Firm* — Brinks Gilson & Lione

(57) ABSTRACT

A stereoscopic image display and a method for manufacturing the same are disclosed. The stereoscopic image display including a first substrate and a second substrate adhered to each other with a liquid crystal layer interposed, black matrices formed between the liquid crystal layer and the first substrate, and black stripes formed between the liquid crystal layer and the second substrate to correspond to the black matrices.

20 Claims, 12 Drawing Sheets

STEREOSCOPIC IMAGE DISPLAY AND METHOD FOR MANUFACTURING THE SAME

This application claims the benefit of Korean Patent Application No. 10-2012-0073267 filed on Jul. 5, 2012, which is incorporated herein by reference for all purposes as if fully set forth herein.

BACKGROUND

1. Field of the Disclosure

This document relates to a stereoscopic image display and a method of manufacturing the same, and more particularly to a stereoscopic image display capable of improving the vertical viewing angle of a stereoscopic image and a method of manufacturing the same.

2. Discussion of the Related Art

A stereoscopic image display realizes a stereoscopic image using a stereoscopic technique or an autostereoscopic technique.

In the stereoscopic technique, left and right parallax images having high stereoscopic effect are used. The stereoscopic image display is divided into a glasses type and a non-glasses type and the two types have been commercialized. In the glasses type, the left and right parallax images are displayed on a direct-view display or projector with their polarization directions reversed or in a time division system and a stereoscopic image is displayed using polarized glasses or liquid crystal shutter glasses. In the non-glasses type, an optical plate such as a parallax barrier is commonly installed in front of or behind a display screen to separate the optical axes of the left and right parallax images.

FIG. 1 is a view illustrating a conventional stereoscopic image display.

Referring to FIG. 1, a glasses type stereoscopic image display 1 includes a thin film transistor (TFT) array substrate 10, a color filter substrate 12 including color filters 13 and black matrices 14, an a liquid crystal layer 15 interposed between the TFT array substrate 10 and the color filter substrate 12. Top and bottom polarizing plates 16a and 16b are positioned on the color filter substrate 12 and the TFT array substrate 10, respectively. A patterned retarder film 19 formed of a patterned retarder 17 and a surface processed protective film 18 is attached onto the top polarizing plate 16a.

The glasses type stereoscopic image display 1 having the above structure alternately displays left eye images and right eye images and switches the polarization characteristic of polarized light incident on polarized glasses through the patterned retarder 17. Therefore, the glasses type stereoscopic image display may spatially separate the left eye images from the right eye images to realize a stereoscopic image.

When the stereoscopic image display realizes the stereoscopic image, a vertical viewing angle is determined by the width of the black matrices and the distance between the color filters and the patterned retarder. In the conventional stereoscopic image display, the width of the black matrices is increased so that the vertical viewing angle of 26 degrees is realized. However, the increase in the width of the black matrices deteriorates an aperture ratio and a viewing region is limited due to the vertical viewing angle of 26 degrees.

SUMMARY

A stereoscopic image display, includes a first substrate and a second substrate adhered to each other with a liquid crystal layer interposed, black matrices formed between the liquid crystal layer and the first substrate, and black stripes formed between the liquid crystal layer and the second substrate to correspond to the black matrices.

In another aspect, there is a method of manufacturing a stereoscopic image display, including forming black matrices on a first substrate, forming black stripes on a second substrate, and adhering the first substrate and the second substrate to each other so that the black matrices face the black stripes to form a liquid crystal layer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
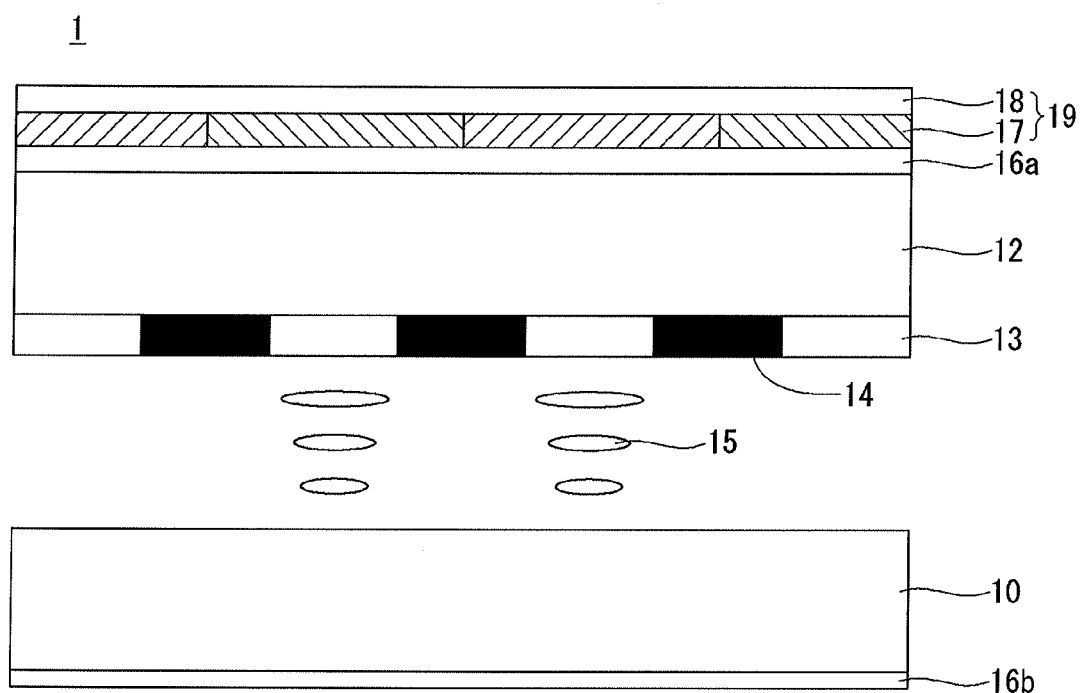
FIG. 1 is a view illustrating a conventional stereoscopic image display.
Figure 2:
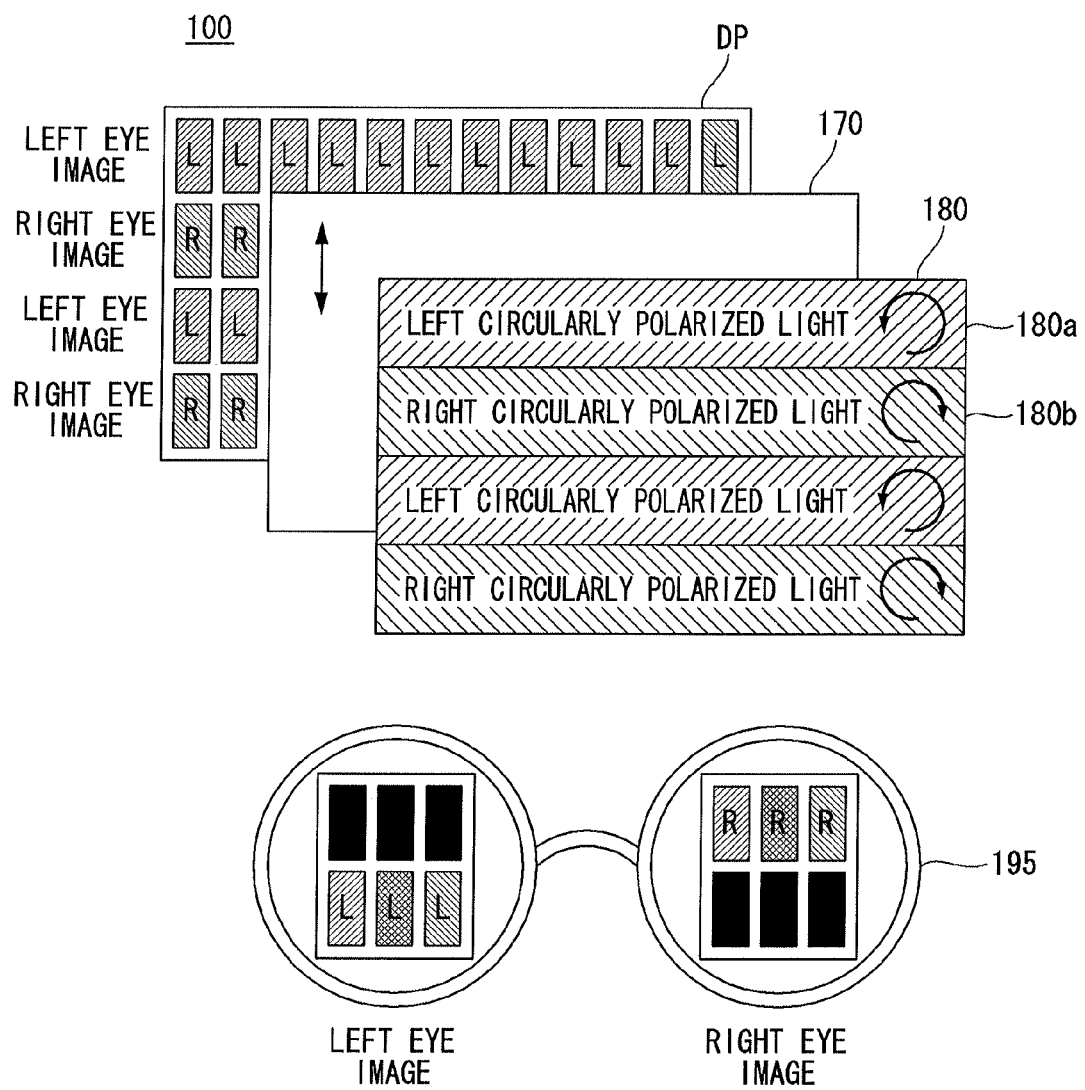
FIG. 2 is a view illustrating a stereoscopic image display according to an embodiment of the present invention.

FIG. 2 is a view illustrating a stereoscopic image display according to an embodiment of the present invention.

Referring to FIG. 2, a stereoscopic image display 100 according to an embodiment of the present invention includes a display panel (DP), a polarizing plate 170, a patterned retarder 180, and polarized glasses 195.

The DP may be realized by other flat panel displays (FPD) such as a field emission display (FED), a plasma display panel (PDP), and an electroluminescence device (EL) as well as a liquid crystal display (LCD) panel.

When the DP is realized by the LCD panel, the stereoscopic image display 100 further includes a backlight unit provided below the DP and a polarizing plate (not shown) provide between the DP and the backlight unit. The patterned retarder 180 and the polarized glasses 195 as stereoscopic image driving elements spatially separate left eye images from right eye images to realize binocular disparity.

The left eye images L and the right eye images R are alternately displayed on the DP line by line. FIG. 2 is for describing that the DP is linear-shaped. The DP is not limited to the above but may be mosaic-shaped as described later. The polarizing plate 170 as an analyzer attached onto the DP transmits only specific linearly polarized light from light that transmits the liquid crystal layer of the DP to be incident.

The patterned retarder 180 includes first retarder patterns 180a and second retarder patterns 180b that are alternately arranged line by line. The retarder patterns are preferably arranged line by line to form (+) 45 degrees and (−) 45 degrees with the absorption axis of the polarizing plate 170. The patterned retarder 180 may be mosaic-shaped in accordance with the display method of the above-described DP.

Each of the retarder patterns delays the phase of light by λ (wavelength)/4 using a birefringence medium. The optical axes of the first retarder patterns are orthogonal to the optical axes of the second retarder patterns.

Therefore, the first retarder patterns 180a are arranged to face the lines in which the left eye images are displayed on the DP to convert the light of the left eye images into first polarized light (circularly polarized light or linearly polarized light). The second retarder patterns 180b are arranged to face the lines in which the right eye images are displayed on the DP to convert the light of the right eye images into second polarized light (circularly polarized light or linearly polarized light). For example, the first retarder patterns 180a may be realized by polarizing filters that transmit left circularly polarized light and the second retarder patterns 180b may be realized by polarizing filters that transmit right circularly polarized light.

The polarizing film that transmits only a first polarized component is attached to the left eye of the polarized glasses 195 and the polarizing film that transmits only a second polarized component is attached to the right eye of the polarized glasses 195. Therefore, the observer who wears the polarized glasses 195 watches only the left eye images by his or her left eye and watches only the right eye images by his or her right eye to feel the image displayed on the DP as a stereoscopic image.

Hereinafter, the stereoscopic image display according to the embodiment of the present invention and a method of manufacturing the same will be described in detail as follows. Hereinafter, the same elements as the components of the above-described stereoscopic image display will be denoted by the same reference numerals and description thereof will be briefly performed.

Figure 3:
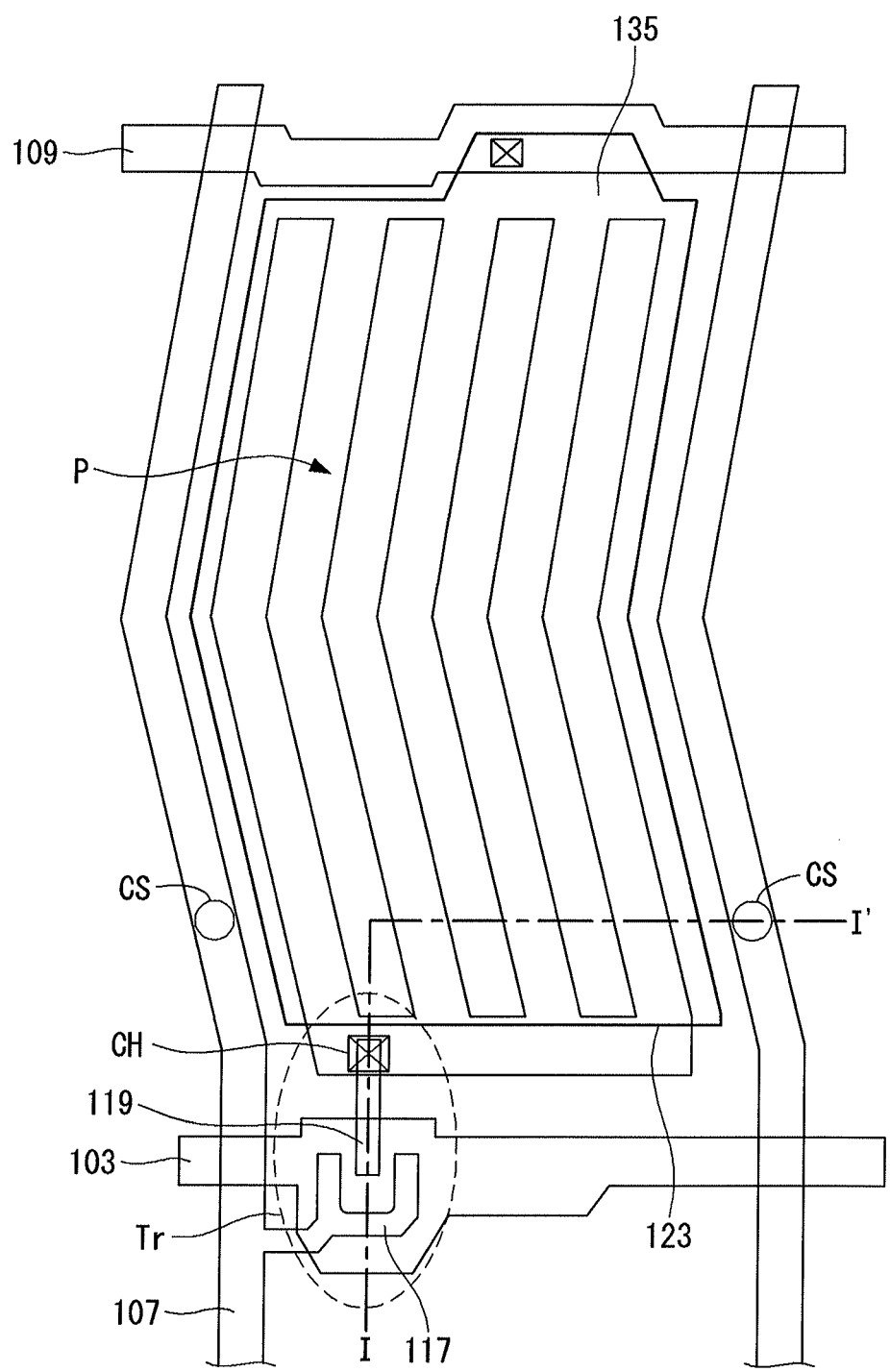
FIG. 3 is a plan view illustrating a stereoscopic image display according to an embodiment of the present invention.
Figure 4:
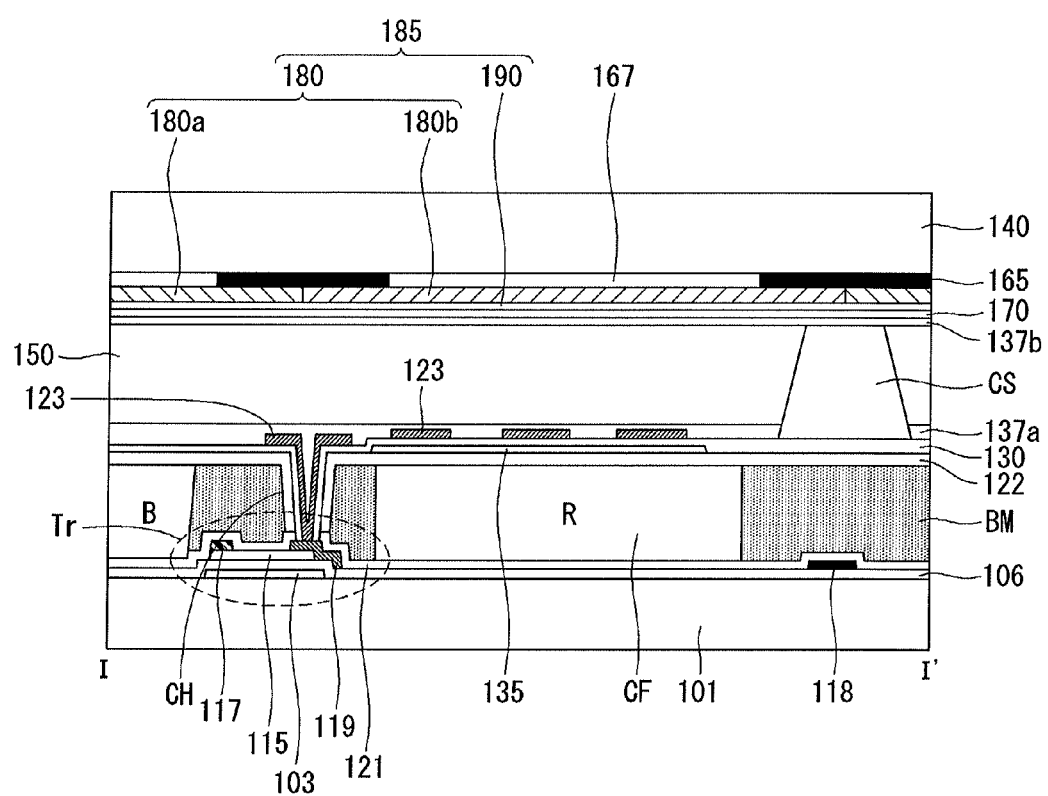
FIGS. 4 to 6 are sectional views taken along the line I-I' of FIG. 3.
Figure 5:
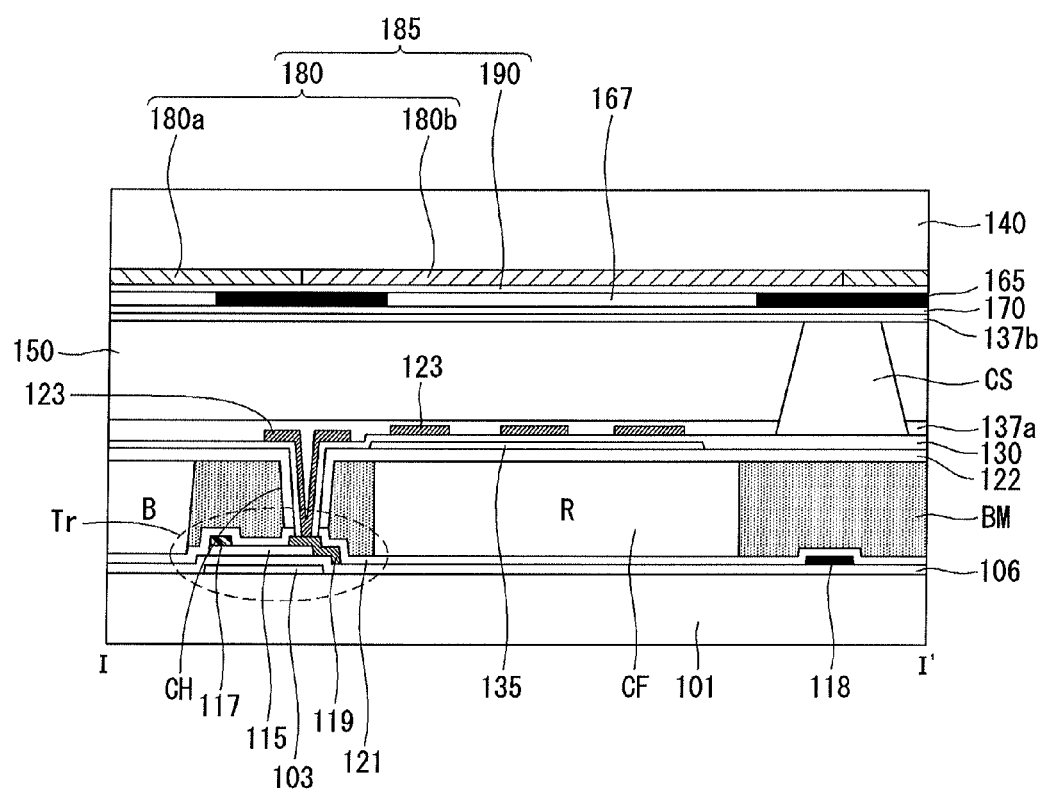
Figure 6:
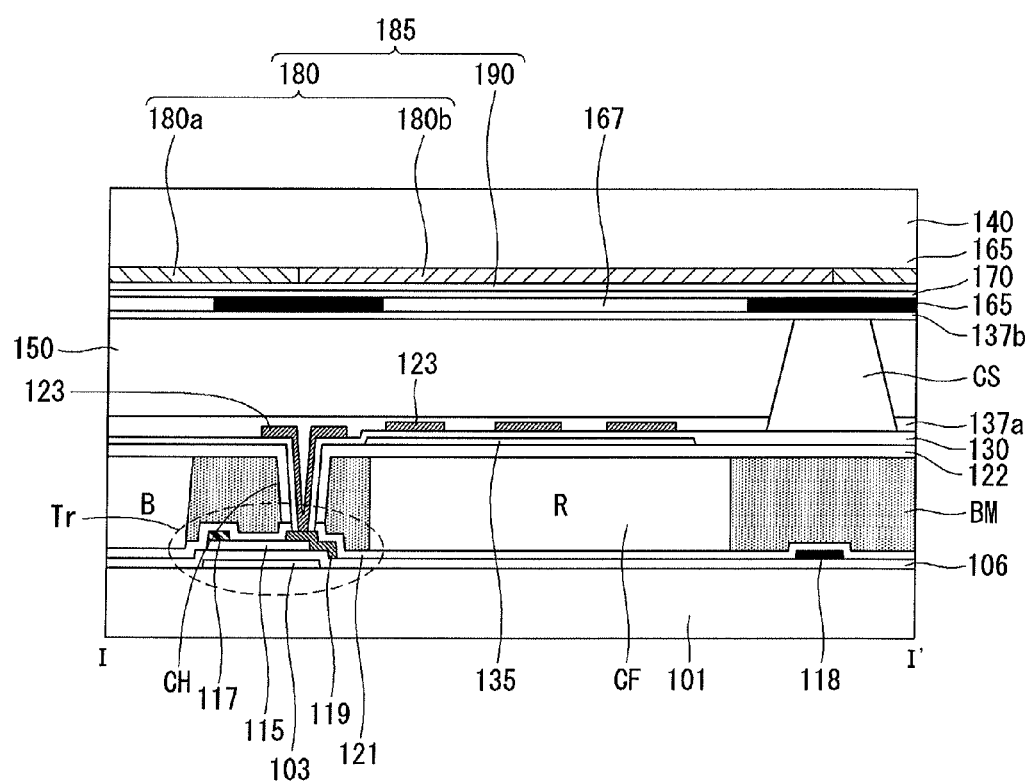

FIG. 3 is a plan view illustrating a stereoscopic image display according to an embodiment of the present invention. FIGS. 4 to 6 are sectional views taken along the line I-I' of FIG. 3. Hereinafter, one subpixel of the stereoscopic image display will be taken as an example.

Referring to FIG. 3, a gate line 103 extended in one direction and provided on a first substrate (not shown) including a subpixel P is positioned and data lines 107 that intersect the gate line 103 to define the subpixel P are positioned. A common line 109 provided to run parallel with the gate line 103 and to intersect the data lines 107 is positioned. A plurality of subpixels P are defined by the intersection of the gate line 103, the data lines 107, and the common line 109.

A thin film transistor (TFT) Tr formed of a gate electrode (not shown) connected to the gate line 103, a gate insulating layer (not shown), a semiconductor layer (not shown), a source electrode 117 electrically connected to the data line 107, and a drain electrode 119 separated from the source electrode 117 is positioned in each of the subpixels P.

In the drawing, in the TFT Tr, a region that forms a channel is U-shaped. However, the present invention is not limited to the above but the TFT Tr may be I-shaped. In addition, in the TFT Tr, the gate electrode is formed of the gate line 103.

However, the present invention is not limited to the above but the gate electrode may protrude from the gate line 103 to the subpixel P.

In each of the subpixels P, a finger-shaped pixel electrode 123 is connected to the drain electrode 119 of the TFT Tr through a contact hole CH. A square plate-shaped common electrode 135 is positioned to correspond to the pixel electrode 123 formed in each of the subpixels P. The common electrode 135 is electrically connected to the common line 109 so that a voltage is applied to the common electrode 135.

Hereinafter, the section structure of the above-described stereoscopic image display in accordance with the plane structure of the above-described stereoscopic image display will be described.

Referring to FIG. 4, in the stereoscopic image display according to the embodiment of the present invention, a gate electrode 103 integrated with a gate line (not shown) provided on a first substrate 101 in one direction is positioned and the gate electrode 103 and a common line (not shown) are positioned on the same plane.

A gate insulating layer 106 for insulating the gate electrode 103 is positioned on the gate electrode 103 and a semiconductor layer 115 is positioned on the gate insulating layer 106 in the region corresponding to the gate electrode 103. The source electrode 117 and the drain electrode 119 are positioned at both ends of the semiconductor layer 115. Therefore, the TFT Tr including the gate electrode 103, the semiconductor layer 115, the source electrode 117, and the drain electrode 119 is formed.

A first passivation layer 121 is formed on the first substrate 101 where the source electrode 117 and the drain electrode 119 are formed. Black matrices BM are formed on the first passivation layer 121 in the regions corresponding the TFT Tr and various lines, for example, the data lines 107, the gate line (not shown), and the common line (not shown). Color filters (CF) are formed in active regions that transmit light excluding the regions in which the black matrices BM are formed. The color filters CF are formed of R, G, and B color filters by pixel and convert the light emitted from a backlight unit into red, green, and blue light components. The black matrices BM and the color filters CF are formed of an organic material to simultaneously protect and insulate the TFT Tr thereunder.

A second passivation layer 122 is formed on the first substrate 101 where the black matrices BM and the color filters CF are formed and the common electrode 135 is formed on the second passivation layer 122 to be electrically connected to the above-described common line (not shown). A third passivation layer 130 is formed on the first substrate 101 where the common electrode 135 is formed and the pixel electrode 123 is formed on the third passivation layer 130. The pixel electrode 123 is connected to the above-described drain electrode 119 through a contact hole CH that penetrates the black matrices BM, the second passivation layer 122, and the third passivation layer 130. The finger-shaped pixel electrode 123 is formed to correspond to the common electrode 135 so that vertical and horizontal electric fields may be simultaneously formed between the pixel electrode 123 and the common electrode 135 when the pixel electrode 123 is driven.

A column spacer CS is formed on the third passivation layer 130 in the region corresponding to a data line 118 so that a gap is maintained between the first substrate 101 and a second substrate that is adhered to the first substrate 101 later. A bottom alignment layer 137a is coated on the entire surface of the first substrate 101 where the column spacer CS is formed so that liquid crystal is aligned later. As described above, the TFT Tr, the black matrices MB, the color filters CF, the pixel electrode 123, the common electrode 135, and the column spacer CS are formed in the first substrate 101 according to the present invention.

Black stripes 165, a patterned retarder film 185, and a polarizing plate 170 are included in the second substrate 140 adhered to the above-described first substrate 101. In detail, the black stripes 165 are formed on the bottom surface of the second substrate 140 that faces the first substrate 101. The black stripes 165 may prevent a crosstalk phenomenon in which the light of the left eye is incident on the right eye or the light of the right eye is incident on the left eye when the stereoscopic image is realized from being generated to improve a vertical viewing angle.

The patterned retarder film 185 is attached under the black stripes 165. In the patterned retarder film 185, as described above, the first retarder patterns 180a and the second retarder patterns 180b are formed on a protective film 190. The first retarder patterns 180a are arranged to face the lines in which the left eye images are displayed on the DP to convert the light of the left eye images into the first polarized light (the circularly polarized light or the linearly polarized light). The second retarder patterns 180b are arranged to face the lines in which the right eye images are displayed on the DP to convert the light of the right eye images into the second polarized light (the circularly polarized light or the linearly polarized light). For example, the first retarder patterns 180a may be realized by the polarizing filters that transmit the left circularly polarized light and the second retarder patterns 180b may be realized by the polarizing filters that transmit the right circularly polarized light.

The polarizing plate 170 is formed under the patterned retarder film 185 to polarize the light that transmits the DP. A top alignment layer 137b for aligning liquid crystal is formed under the polarizing plate 170. The above-described first and second substrates 101 and 140 are adhered to each other with the liquid crystal layer 150 interposed to form the stereoscopic image display according to the present invention.

As described above, in the stereoscopic image display according to the embodiment of the present invention, the color filters and the black matrices are formed in the first substrate and only the minimum top alignment layer is positioned in the second substrate so that the black stripes, the patterned retarder film, and the polarizing plate may be formed on the bottom surface of the second substrate without limitations.

Here, according to the present invention, the black stripes, the patterned retarder film, and the polarizing plate are positioned between the bottom surface of the second substrate, that is, the liquid crystal layer and the second substrate. Among the black stripes, the patterned retarder film, and the polarizing plate, the black stripes may be positioned anywhere between the second substrate and the liquid crystal layer.

Referring to FIG. 5, the black stripes 165 may be formed between the patterned retarder film 185 and the polarizing plate 170. In detail, the patterned retarder film 185 is attached to the bottom surface of the second substrate 140 and the black stripes 165 are formed under the patterned retarder film 185. The polarizing plate 170 is attached to the patterned retarder film 185 under which the black stripes 165 are formed.

In addition, referring to FIG. 6, the black stripes 165 may be formed between the polarizing plate 170 and the top alignment layer 137b. That is, the patterned retarder film 185 is attached to the bottom surface of the second substrate 140, the polarizing plate 170 is attached under the patterned retarder film 185, and the black stripes 165 are formed in the polarizing plate 170. The top alignment layer 137b is coated on the black stripes 165.

As described above, in the stereoscopic image display according to the embodiment of the present invention, the black stripes, the patterned retarder film, and the polarizing plate are formed between the liquid crystal layer and the second substrate so that the vertical viewing angle of the stereoscopic image may be improved.

Figure 7:
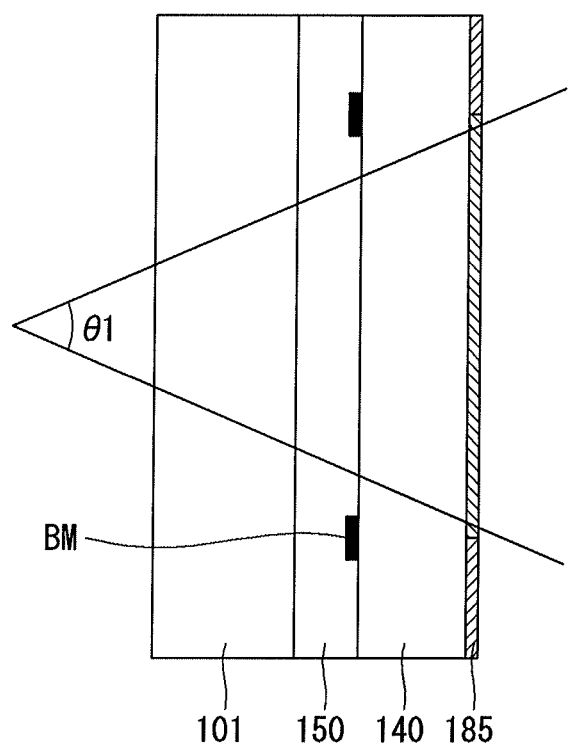
FIG. 7 is a block diagram illustrating the vertical viewing angle of the conventional stereoscopic image display.
Figure 8:
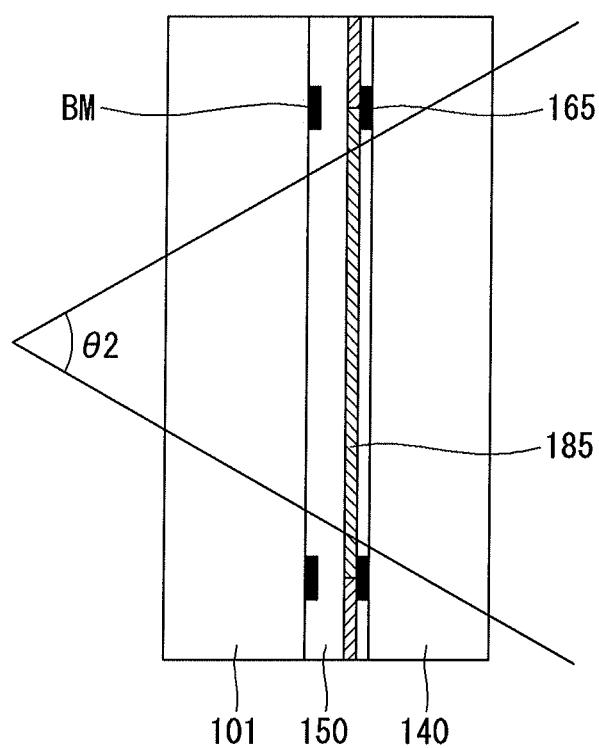
FIG. 8 is a block diagram illustrating the vertical viewing angle of the stereoscopic image display according to the present invention.

FIG. 7 is a block diagram illustrating the vertical viewing angle of the conventional stereoscopic image display. FIG. 8 is a block diagram illustrating the vertical viewing angle of the stereoscopic image display according to the present invention.

Referring to FIG. 7, in the conventional stereoscopic image display, the first substrate 101 and the second substrate 140 are adhered to each other with the liquid crystal layer 150 interposed. At this time, the black matrices BM are formed between the second substrate 140 and the liquid crystal layer 150 and the patterned retarder film 185 is formed on the external surface of the second substrate 140. The conventional stereoscopic image display has the vertical viewing angle θ1 formed by the black matrices BM and the patterned retarder film 185.

On the other hand, referring to FIG. 8, in the stereoscopic image display according to the present invention, unlike in the above-described FIG. 7, the black matrices BM are formed in the first substrate 101 and the black stripes 165 and the patterned retarder film 185 are formed between the second substrate 140 and the liquid crystal layer 150. In the stereoscopic image display according to the present invention, the vertical viewing angle θ2 formed by the black matrices BM, the black stripes 165, and the patterned retarder film 185 is formed to be larger than the vertical viewing angle θ1 of the conventional stereoscopic image display.

According to the present invention, the black matrices BM are formed in the first substrate 101 and the black stripes 165 and the patterned retarder film 185 are formed between the second substrate 140 and the liquid crystal layer 150 so that the distance between the black matrixes BM and the patterned retarder film 183 and the black stripes 165 by which the vertical viewing angle is determined may be reduced and that the vertical viewing angle may be increased due to the reduction in the distance between the black matrices BM and the patterned retarder film 185 and the black stripes 165.

On the other hand, in the stereoscopic image display according to the embodiment of the present invention, a mosaic-shaped patterned retarder film may be used instead of the above-described linear-shaped patterned retarder film.

Figure 9:
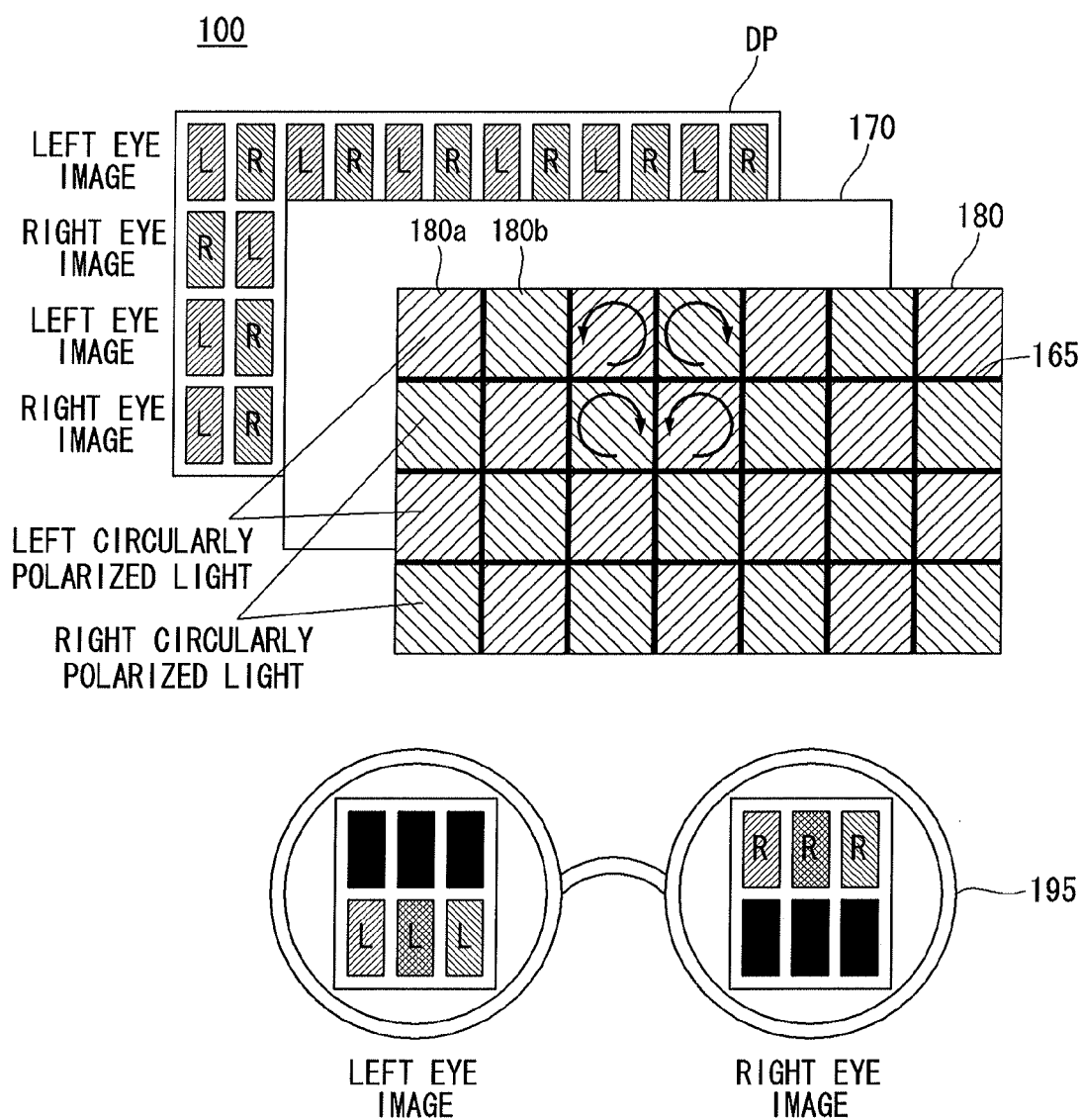
FIG. 9 is a view illustrating a stereoscopic image display including a mosaic-shaped patterned retarder.

FIG. 9 is a view illustrating a stereoscopic image display including a mosaic-shaped patterned retarder. Since the principle of the mosaic-shaped patterned retarder is the same as the principle of the above-described linear-shaped patterned retarder although the arrangement structure of the mosaic-shaped patterned retarder is different from the arrangement structure of the above-described linear-shaped patterned retarder, redundant description will be omitted. In addition, in FIG. 9, the same elements as the elements of FIG. 2 are denoted by the same reference numerals to facilitate understanding. The left eye images L and the right eye images R are alternately displayed on the DP in the form of a mosaic where the left eye images L and the right eye images R are alternately arranged in one line. As illustrated in FIG. 9, the left eye images L and the right eye images R are alternately arranged in a first line and the right eye images R and the left eye images L are alternately arranged in a second line not to overlap the first line.

The mosaic-shaped patterned retarder 180 attached to the DP includes the first retarder patterns 180a and the second retarder patterns 180b that are alternately arranged in one line to correspond to the images displayed on the DP. Therefore, the first retarder patterns 180a are arranged to face the regions in which the left eye images L are displayed in the DP to convert the light of the left eye images into the first polarized light (the circularly polarized light or the linearly polarized light. The second retarder patterns 180b are arranged to face the regions in which the right eye images R are displayed in the DP to convert the light of the right eye images R into the second polarized light (the circularly polarized light or the linearly polarized light). For example, the first retarder patterns 180a may be realized by the polarizing filters that transmit the left circularly polarized light and the second retarder patterns 180b may be realized by the polarizing filters that transmit the right circularly polarized light.

The black stripes 165 provided in the stereoscopic image display according to the present invention are latticed along the interfaces of the first retarder patterns 180a and the second retarder patterns 180b to prevent the crosstalk phenomenon in which the light of the left eye images transmits the second retarder patterns 180b and the light of the right eye images transmits the first retarder patterns 180a from being generated. According to the present invention, when the mosaic-shaped patterned retarder is applied, a horizontal viewing angle as well as the vertical viewing angle may be increased.

Hereinafter, a method of manufacturing the above-described stereoscopic image display according to the embodiment of the present invention will be described as follows. Hereinafter, the above-described structure of FIG. 4 will be taken as an example and the same elements are denoted by the same reference numerals to facilitate understanding.

FIGS. 10 to 14 are sectional views illustrating a method of manufacturing the stereoscopic image display according to the embodiment of the present invention by process.

Figure 10:
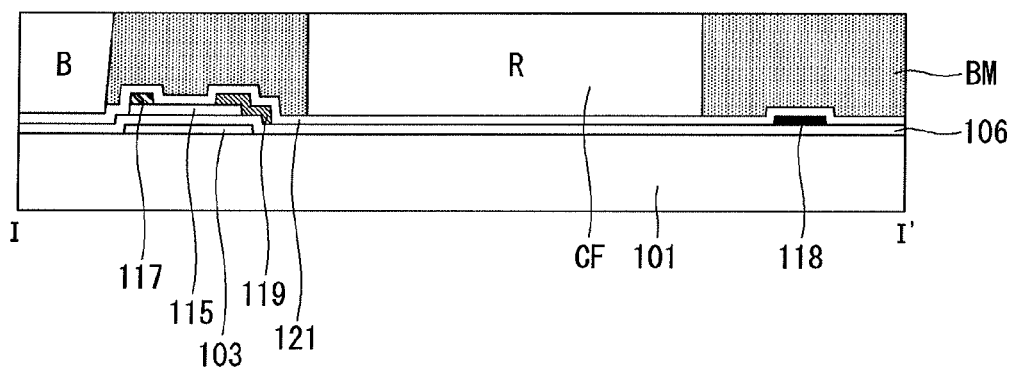
FIGS. 10 to 14 are sectional views illustrating a method of manufacturing the stereoscopic image display according to the embodiment of the present invention by process.

Referring to FIG. 10, in the method of manufacturing the stereoscopic image display according to the embodiment of the present invention, a metal material having a low resistance characteristic, for example, a metal material selected from Al, AlNd, Cu, a Cu alloy, Cr, Mo, and Ti is deposited on the first substrate 101. The deposited metal material is patterned to form the gate electrode 103 and a common line (not shown).

Next, SiOx or SiNx is deposited on the gate electrode 103 and the common line (not shown) to form the gate insulating layer 106. Then, amorphous silicon is deposited on the first substrate 101 and is patterned to form the semiconductor layer 115. Then, a metal material having a low resistance characteristic, for example, a metal material selected from Al, AlNd, Cu, a Cu alloy, Cr, Mo, and Ti is deposited on the first substrate 101 where the semiconductor layer 115 is formed. Then, the metal material is patterned to form the source electrode 117 and the drain electrode 119 connected to the both ends of the semiconductor layer 115 and the data line 118.

Next, SiOx or SiNx is deposited on the first substrate 101 including the source electrode 117 and the drain electrode 119 to form the first passivation layer 121. Next, black resin is coated on the first substrate 101 and is patterned to form the black matrices BM and resin including organic pigment is coated and patterned to form the R, G, and B color filters CF.

Figure 11:
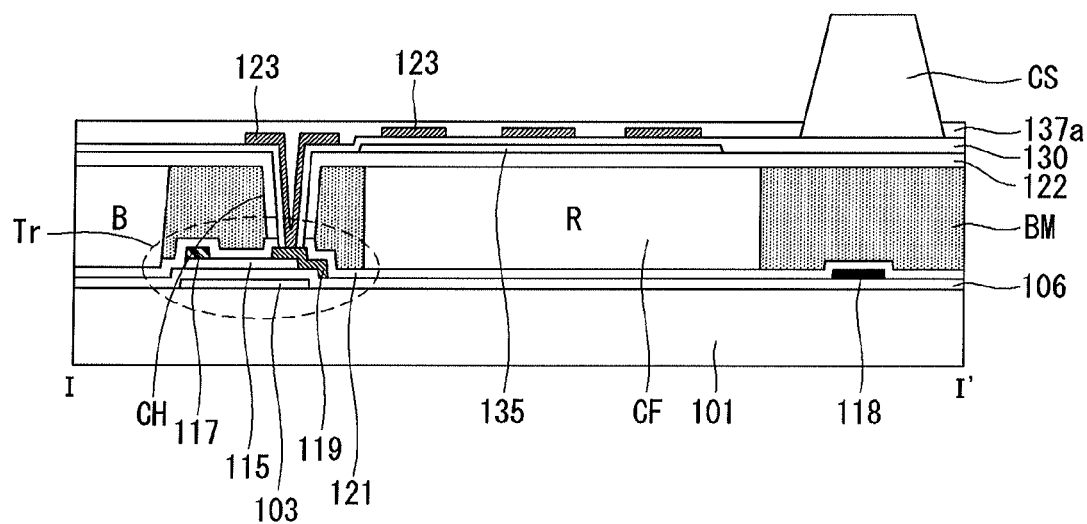

Then, referring to FIG. 11, SiOx or SiNx is deposited on the first substrate 101 where the black matrices BM and the color filters CF are formed to form the second passivation layer 122. A transparent conductive material selected from ITO, IZO, ITZO, and ZnO is deposited on the first substrate 101 and is patterned to form the common electrode 135. SiOx or SiNx is deposited on the first substrate 101 where the common electrode 135 is formed to form the third passivation layer 130. The first to third passivation layers 121, 122, and 130 are etched to form the contact hole CH that exposes the drain electrode 119.

Next, a transparent conductive material selected from ITO, IZO, ITZO, and ZnO is deposited on the first substrate 101 and is patterned to form the pixel electrode 123. The pixel electrode 123 directly contacts the drain electrode 119 through the contact hole CH and is finger-shaped in the region corresponding to the common electrode 135. A column spacer CS is formed in the region corresponding to the data line 118 and the black matrix BM. Then, polyimide is coated on the substrate 101 where the column spacer CS and the pixel electrode 123 are formed to form the bottom alignment layer 137a so that the first substrate 101 is manufactured.

Figure 12:
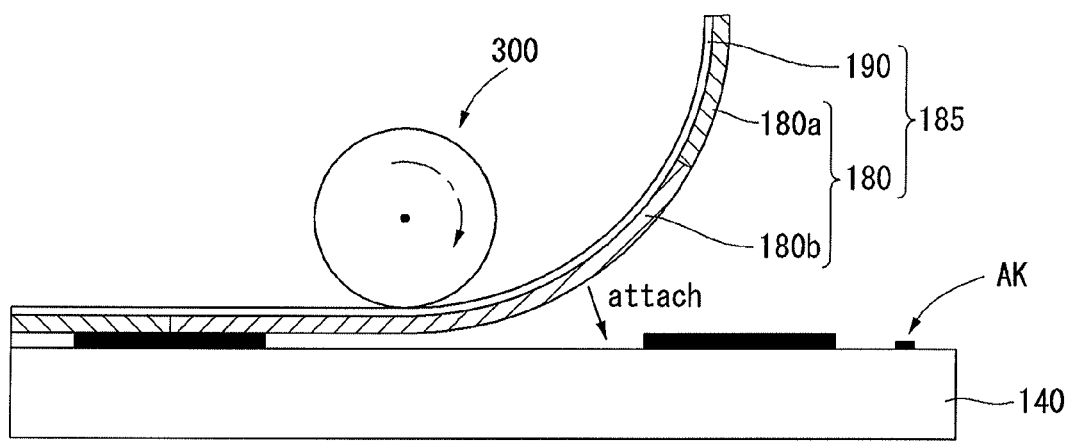

Next, referring to FIG. 12, the black stripes 165 are formed on the second substrate 140 that is a transparent glass substrate. The black stripes 165 may be formed of the same material as the above-described black matrices BM, in particular, may be simultaneously formed with an align key AK for adhering the second substrate 140 to the first substrate 101. Next, after the first retarder patterns 180a and the second retarder patterns 180b are formed on the protective film 190 to manufacture the patterned retarder film 185, the patterned retarder film 185 is attached to the second substrate 140 in which the above-described black stripes 165 are formed by a laminating method.

Figure 13:
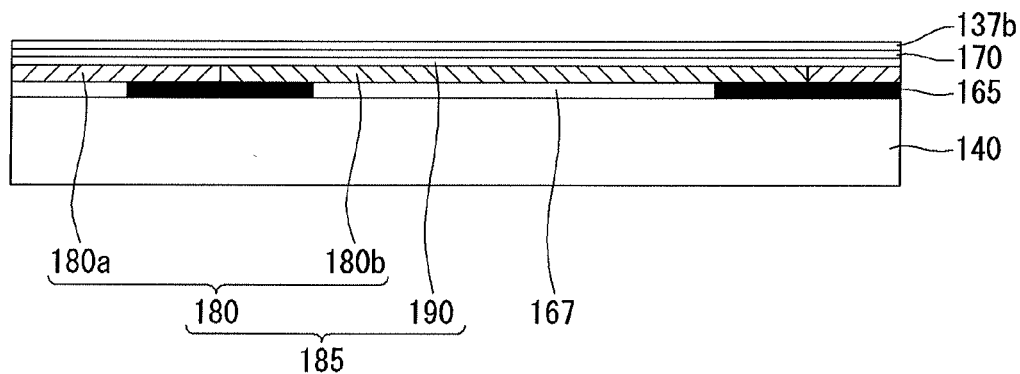
Figure 14:
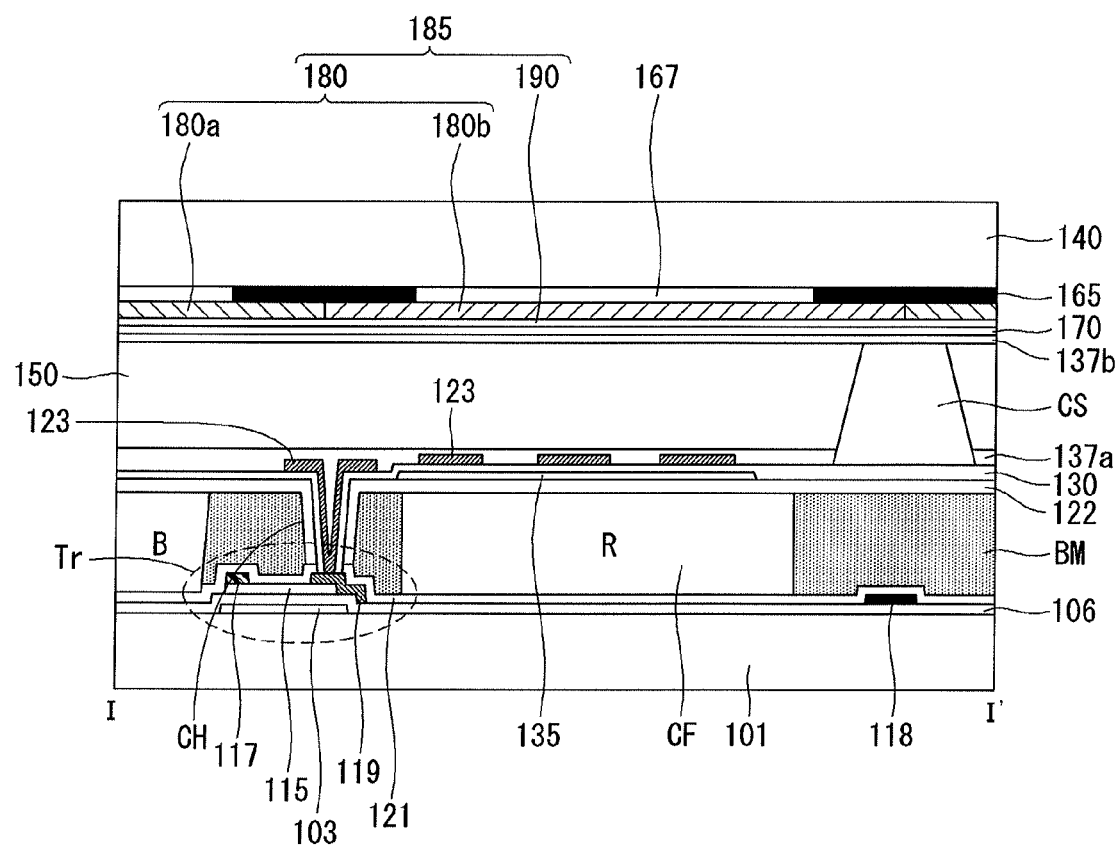

Next, referring to FIG. 13, the polarizing layer 170 is attached onto the patterned retarder film 185 and polyimide is coated on the polarizing plate 170 to form the top alignment layer 137b so that the second substrate 140 is manufactured. As illustrated in FIG. 14, after adhering the first substrate 101 and the second substrate 140 to each other, the liquid crystal layer 150 is injected so that the stereoscopic image display according to the embodiment of the present invention is manufactured.

As described above, in the stereoscopic image display according to the embodiment of the present invention, the black matrices are formed on the first substrate and the black stripes and the patterned retarder film are formed between the second substrate and the liquid crystal layer so that the vertical viewing angle may be increased. In addition, the patterned retarder film is attached using the laminating method so that processes may be simplified.

Hereinafter, preferred embodiments are disclosed in order to facilitate understanding of the present invention. The following embodiments are only examples of the present invention and the present invention is not limited to the following embodiments.

COMPARATIVE EXAMPLE 1

A 2D display in which a patterned retarder is not formed is manufactured. At this time, the width of the black matrices is formed to be 36 μm.

COMPARATIVE EXAMPLE 2

A stereoscopic image display in which a patterned retarder film and a polarizing plate are attached to the external surface of a second substrate is manufactured. At this time, the width of the black matrices is formed to be 172 μm

COMPARATIVE EXAMPLE 3

A stereoscopic image display in which a patterned retarder film and a polarizing plate are attached between a liquid crystal layer and a second substrate is manufactured. At this time, the width of the black matrices is formed to be 80 μm.

COMPARATIVE EXAMPLE 4

Under the same condition as the above-described comparative example 3, a patterned retarder film is not attached and a patterned retarder is directly formed in a second substrate. At this time, the width of the black matrices is formed to be 36 μm.

COMPARATIVE EXAMPLE 5

Under the same condition as the above-described comparative example 4, only the width of the black matrices is formed to be 55 μm.

EMBODIMENT 1

Under the same condition as the above-described comparative example 3, black stripes are further formed between a patterned retarder film and a second substrate. At this time, the width of the black matrices and the black stripes is formed to be 36 μm.

EMBODIMENT 2

Under the same condition as the above-described embodiment 1, only the width of the black stripes is formed to be 41 μm.

A 47 inch full-HD model in which a 0.5t glass substrate is used is used as the displays according to the above-described comparative examples 1 to 5 and the embodiments 1 and 2 use. Viewing angles and aperture ratios are measured and are illustrated in table 1. Here, in the stereoscopic image display, it is experimented that the attachment allowance of the patterned retarder film is 50 μm and the thickness of the patterned retarder film is 205 μm based on the crosstalk of 10%.

TABLE 1

| Model | Viewing angle (°) (cone/one side) | Aperture ratio (%) | Width of black matrices/width (μm) of black stripes |
|---|---|---|---|
| Comparative example 1 | — | 66.3 | 36/— |
| Comparative example 2 | 29/±8 | 51.2 | 172/— |
| Comparative example 3 | Free/±29 | 60.5 | 80/— |
| Comparative example 4 | 59/±6 | 66.3 | 36/— |
| Comparative example 5 | 67/±10 | 63.5 | 55/— |
| Embodiment 1 | 160/±42 | 66.3 | 36/36 |
| Embodiment 2 | Free/±47 | 65.5 | 36/41 |

Referring to the table 1, in the stereoscopic image displays manufactured by the embodiments 1 and 2 according to the present invention, the vertical viewing angle is remarkably increased and a one side viewing angle is also increased in comparison with the comparative examples 2 to 5. In addition, the aperture ratios of the stereoscopic image displays of the embodiments 1 and 2 are almost equal to the high aperture ratio of the 2D display of the comparative example 1.

In the above-described embodiments of the present invention, all of the black stripes are formed. However, the present invention is not limited to the above. Although the black stripes are omitted, the viewing angle and the aperture ratio of the stereoscopic image display may be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A stereoscopic image display, comprising:
a first substrate and a second substrate adhered to each other with a liquid crystal layer interposed therebetween;
black matrices disposed between the liquid crystal layer and the first substrate; and
black stripes disposed between the liquid crystal layer and the second substrate to correspond to the black matrices; and
a patterned retarder film disposed between the liquid crystal layer and the second substrate.
2. The stereoscopic image display of claim 1, further comprising:
a polarizing plate disposed between the patterned retarder film and the liquid crystal layer, and
the patterned retarder film is disposed between the liquid crystal layer and the black stripes.
3. The stereoscopic image display of claim 1, further comprising:
a polarizing plate disposed between the black stripes and the liquid crystal layer, and
the patterned retarder film is disposed between the second substrate and the black stripes.
4. The stereoscopic image display of claim 1, further comprising:
a polarizing plate disposed between the patterned retarder film and the black stripes, and
the patterned retarder film is disposed between the second substrate and the black stripes.
5. The stereoscopic image display of claim 2, wherein the first substrate comprises a thin film transistor (TFT), a pixel electrode, and a common electrode.
6. The stereoscopic image display of claim 3, wherein the first substrate comprises a thin film transistor (TFT), a pixel electrode, and a common electrode.
7. The stereoscopic image display of claim 4, wherein the first substrate comprises a thin film transistor (TFT), a pixel electrode, and a common electrode.
8. The stereoscopic image display of claim 2, wherein the first substrate comprises color filters, black matrices, and a column spacer.
9. The stereoscopic image display of claim 3, wherein the first substrate comprises color filters, black matrices, and a column spacer.
10. The stereoscopic image display of claim 4, wherein the first substrate comprises color filters, black matrices, and a column spacer.
11. The stereoscopic image display of claim 2, wherein the black stripes are stripe-shaped or mosaic-shaped.
12. The stereoscopic image display of claim 3, wherein the black stripes are stripe-shaped or mosaic-shaped.

13. The stereoscopic image display of claim 4, wherein the black stripes are stripe-shaped or mosaic-shaped.

14. A method of manufacturing a stereoscopic image display, comprising:
   forming black matrices on a first substrate;
   forming black stripes and a patterned retarder film on a second substrate; and
   adhering the first substrate and the second substrate to each other so that the black matrices face the black stripes to form a liquid crystal layer.

15. The method of claim 14, further comprising, between forming the black stripes and adhering the first substrate and the second substrate to each other:
   forming the patterned retarder film on the black stripes; and
   forming a polarizing plate on the patterned retarder film.

16. The method of claim 14, further comprising:
   forming the patterned retarder film on the second substrate before forming the black stripes; and
   forming a polarizing plate on the black stripes after forming the black stripes.

17. The method of claim 14, further comprising, before forming the black stripes:
   forming the patterned retarder film on the second substrate; and
   forming a polarizing plate on the patterned retarder film.

18. The method of anyone of claim 15, wherein the patterned retarder film is formed by a laminating method.

19. The method of anyone of claim 16, wherein the patterned retarder film is formed by a laminating method.

20. The method of anyone of claim 17, wherein the patterned retarder film is formed by a laminating method.

* * * * *